United States Patent
Meacham et al.

(10) Patent No.: US 7,236,747 B1
(45) Date of Patent: Jun. 26, 2007

(54) INCREASING OFDM TRANSMIT POWER VIA REDUCTION IN PILOT TONE

(75) Inventors: Dan Meacham, San Diego, CA (US); Torbjorn A. Larsson, San Diego, CA (US)

(73) Assignees: Samsung Electronics Co., Ltd. (SAIT), Seocho-gu (KR); Staccato Communications, Inc., San Diego, CA (US)

( * ) Notice: Subject to any disclaimer, the term of this patent is extended or adjusted under 35 U.S.C. 154(b) by 368 days.

(21) Appl. No.: 10/871,603

(22) Filed: Jun. 17, 2004

Related U.S. Application Data

(60) Provisional application No. 60/479,763, filed on Jun. 18, 2003.

(51) Int. Cl.
*H04B 1/00* (2006.01)
*H04B 7/00* (2006.01)

(52) U.S. Cl. .............. 455/69; 455/522; 455/41.2; 370/208; 370/210; 370/328; 370/335; 375/260; 375/285; 375/141

(58) Field of Classification Search ............ 455/69, 455/522; 370/208, 335, 328, 210
See application file for complete search history.

(56) References Cited

U.S. PATENT DOCUMENTS

| | | | | |
|---|---|---|---|---|
| 5,748,677 A | * | 5/1998 | Kumar | .............. 375/285 |
| 6,026,125 A | * | 2/2000 | Larrick et al. | .............. 375/295 |
| 6,094,458 A | * | 7/2000 | Hellberg | .............. 375/242 |
| 6,125,124 A | * | 9/2000 | Junell et al. | .............. 370/503 |
| 6,292,519 B1 | * | 9/2001 | Popovic | .............. 375/346 |
| 6,621,808 B1 | * | 9/2003 | Sadri | .............. 370/335 |
| 6,690,741 B1 | * | 2/2004 | Larrick et al. | .............. 375/295 |
| 6,754,195 B2 | * | 6/2004 | Webster et al. | .............. 370/335 |
| 6,985,498 B2 | * | 1/2006 | Laroia et al. | .............. 370/478 |

* cited by examiner

*Primary Examiner*—Marceau Milord
(74) *Attorney, Agent, or Firm*—Van Pelt, Yi & James LLP

(57) ABSTRACT

Transmitting an ultra wideband (UWB) signal in some embodiments comprises reducing power within a first sub-band with respect to a nominal power of the UWB signal within the first sub-band and correspondingly increasing power within a second sub-band with respect to a nominal power of the UWB signal within the second sub-band. An ultra wideband (UWB) transmitter comprises an input interface configured to receive data, a modulator configured to modulate received data into symbols and a power shaping component coupled to the modulator, configured to shape power density spectrum of a UWB signal being transmitted. Transmitting an ultra wideband (UWB) signal in some embodiments comprises determining whether to power shape the UWB signal; in the event that it is determined that the UWB signal is to be power shaped, reducing power within a first sub-band with respect to the nominal power of the UWB signal within the first sub-band; and correspondingly increasing power within a second sub-band with respect to the nominal power of the UWB signal within the second sub-band such that bandwidth of the UWB signal is maintained to be greater than or equal to a required bandwidth.

13 Claims, 5 Drawing Sheets

INCREASING OFDM TRANSMIT POWER VIA REDUCTION IN PILOT TONE

CROSS REFERENCE TO RELATED APPLICATIONS

This application claims priority to U.S. Provisional Patent Application No. 60/479,763 entitled INCREASING OFDM TRANSMIT POWER VIA REDUCTION IN PILOT TONE filed Jun. 18, 2003, which is incorporated herein by reference for all purposes.

FIELD OF THE INVENTION

The present invention relates generally to communication systems. More specifically, an ultra wideband (UWB) communication system and its related methods are disclosed.

BACKGROUND OF THE INVENTION

In some wireless communication systems such as orthogonal frequency division multiplexing (OFDM) systems, data is transmitted and received via multiple carrier frequencies. For example, in UWB systems such as Multi-Band OFDM Alliance (MBOA) or 802.15.3a systems, there are approximately 128 independent OFDM sub-carriers (tones) that occupy approximately 528 megahertz of bandwidth. Data is modulated and transmitted via many of the sub-carriers. Approximately 10 of the sub-carriers do not necessarily carry information. These sub-carriers, also referred to as pilot tones, may be used to guard the information carrying sub-carriers, to simplify the filtering requirements of the system, or to provide reference phase/amplitude information for the demodulator. The positions of the pilot tones may be defined according to the communication standard or defined by the user/designer of the system. Some pilot tones are located on two ends of the frequency spectrum and some of the pilot tones are interspersed within the frequency spectrum.

Transmission schemes are typically subject to Federal Communications Commission (FCC)'s regulatory requirements, which place restrictions on various aspects of transmission such as bandwidth, power, etc. In current standards proposal for UWB systems, all the sub-carriers, including the pilot tones, are transmitted with approximately the same average power. Since the total amount of power that can be transmitted over the allotted bandwidth is typically restricted for UWB systems, it would be useful if the power could be more efficiently utilized to improve the systems' signal quality. It would also be desirable to achieve the improvements without breaching the regulatory requirements.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for transmitting a UWB signal is disclosed. The power spectral density of the transmitted signal may be shaped for greater power efficiency. In some embodiments, power of pilot tones is reduced with respect to the nominal power of the sub-band occupied by the pilot tones while power of data carrying sub-carriers is increased. In some embodiments, a power shaping controller determines whether power shaping should take place. There are several ways to implement power shaping. Amplitudes of modulated symbols are scaled in some embodiments. A time domain wave form obtained by applying an Inverse Fast Fourier Transform to the symbols is filtered in some embodiments.

Figure 1:
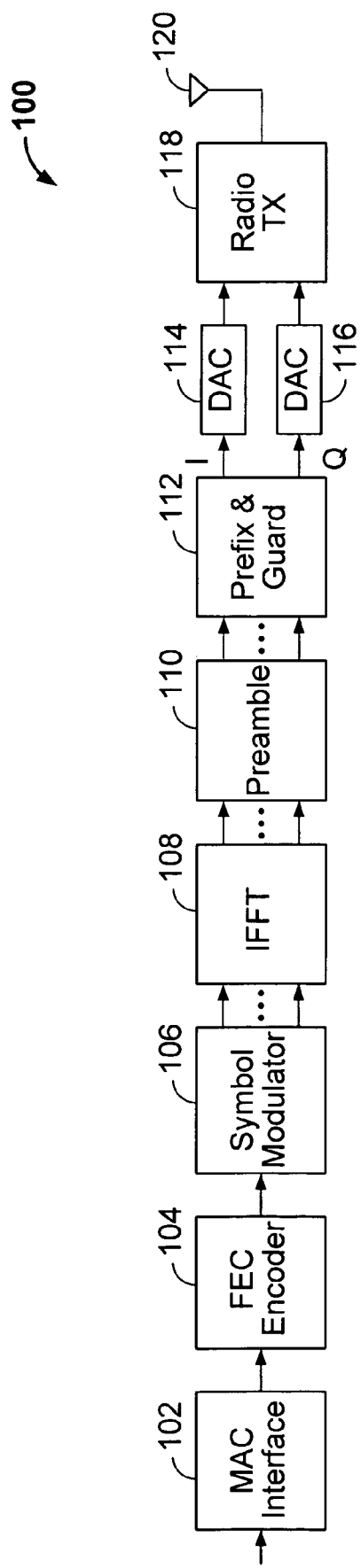
FIG. 1 is a block diagram illustrating an OFDM transmitter embodiment.

FIG. 1 is a block diagram illustrating an OFDM transmitter embodiment. In this example, input sent to transmitter 100 is sent via a media access controller (MAC) interface 102 to a forward error correction (FEC) encoder 104 to be encoded. In some embodiments, the encoded bits are optionally interleaved and repeated to provide better protection against multipath and interference. The bits are then mapped to modulation symbols by a symbol modulator 106. In the OFDM system shown in this example, quadrature phase shift keying (QPSK) modulation is employed, although other modulation schemes are also applicable. Pilot tones may be inserted into the symbol modulated signal at specified locations. An inverse Fast Fourier Transform (IFFT) processor 108 is used to transfer blocks of 100 consecutive QPSK symbols into a time domain waveform (also referred to as an OFDM symbol). A preamble is then added to the OFDM symbol by preamble processor 110. In some embodiments, a guard interval and a cyclic prefix are added to the OFDM symbol by processor 112. In some embodiments, interpolation and amplitude clipping are optionally applied to the OFDM symbol. The inphase (I) and quadrature (Q) components of the baseband OFDM signal are converted from digital to analog by digital to analog converters 114 and 116, respectively. The analog signals are sent to a radio transmitter 118 and sent via antenna 120.

Figure 2A:
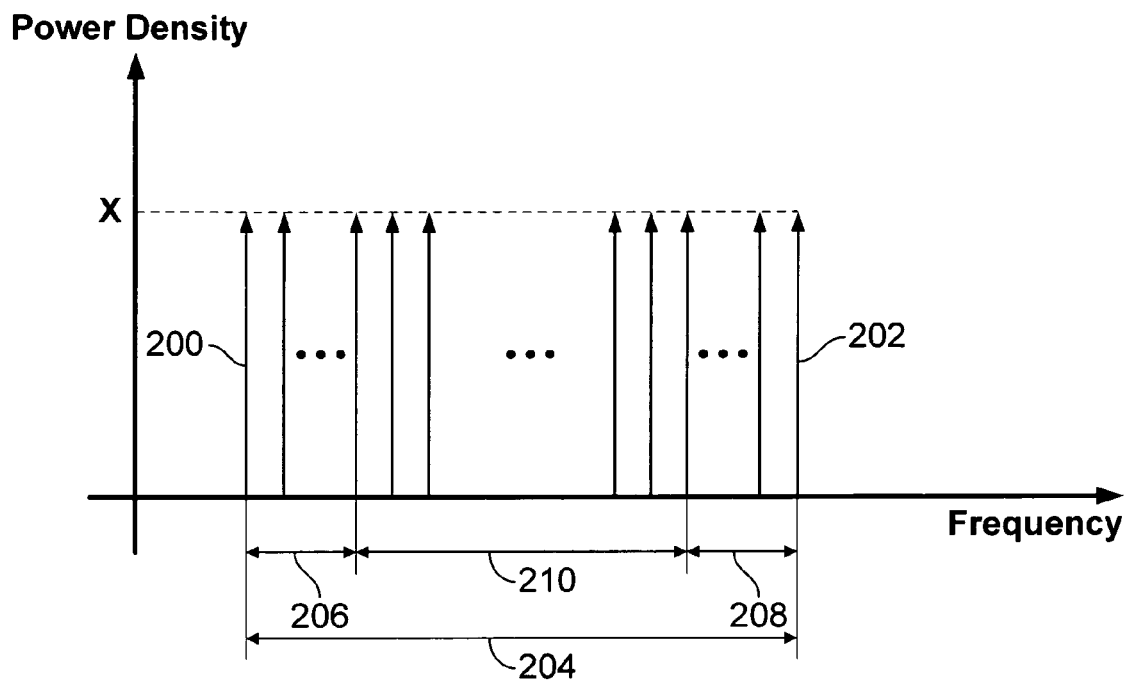
FIG. 2A is a diagram illustrating the power density spectrum of the output of an OFDM transmitter embodiment without power shaping.

FIG. 2A is a diagram illustrating the power spectral density of the output of an OFDM transmitter embodiment without power shaping. In this example, the sub-carriers, including pilot tones that do not carry information (such as pilot tones 200 and 202), have approximately the same average power density level X. The pilot tones occupy sub-bands 206 and 208; the data carrying sub-carriers occupy sub-band 210. The amount of power transmitted in each of the sub-bands without power shaping is referred to as the nominal power of the signal within the particular sub-band. Both the total amount of power transmitted across transmission band 204 of the UWB transmitter (referred to as the aggregate power) and the bandwidth of the transmitted signal are subject to FCC regulation. The aggregate power is required to stay below a maximum and the bandwidth of the transmitted UWB signal is required to stay above a minimum. For purposes of illustration, in examples shown in FIGS. 2A–2D, it is assumed that the bandwidth of 204 is the minimum bandwidth required by FCC.

Figure 2B:
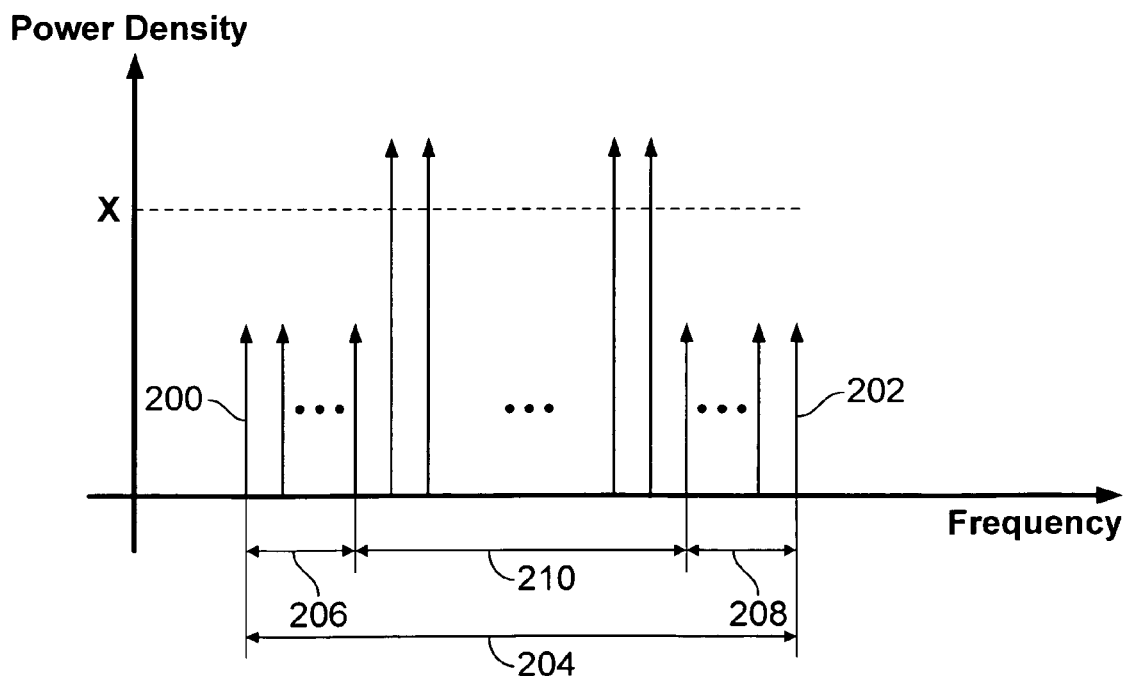
FIG. 2B is a diagram illustrating the power density spectrum of a UWB transmitter embodiment with power shaping.

The power of the transmitted signal may be reshaped to improve transmission efficiency. FIG. 2B is a diagram illustrating the power density spectrum of a UWB transmitter embodiment with power shaping. In this example, power of pilot tones in sub-bands 206 and 208 are reduced with respect to the nominal power of the signal within each of the sub-bands and power of the data carrying sub-carriers in sub-band 210 is increased with respect to the nominal power of the sub-band, while the required bandwidth 204 is maintained. As used herein, the bandwidth of a UWB signal is a 10 dB bandwidth measured as the difference between frequencies 200 and 202, which are bandwidth delimiting frequencies beyond which the power density of the signal drops 10 dB or more below the maximum power density of the signal. Other bandwidth definitions may be applicable in other embodiments.

The power shaping technique, which increases the link margin of the transmitted signal, is sometimes referred to as "bit loading". In some embodiments, the average power of each transmitted symbol is increased, thus the transmitted signal can reach the receiver with better signal quality. In some embodiments, greater transmission power allows the data to be encoded using more efficient coding techniques without causing significant signal quality degradation for the receiver. The power adjustments are preferably made in such a way that the aggregate power across the transmission band does not exceed the preset limit, and the bandwidth of the adjusted signal does not fall below the required bandwidth.

Figure 2C:
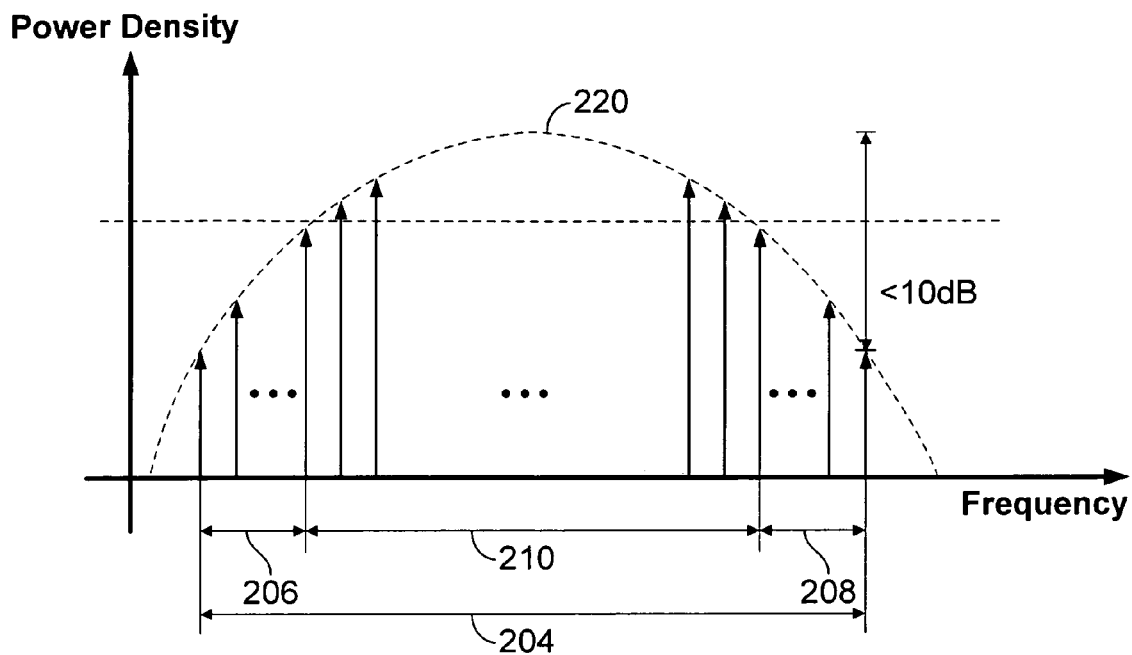
FIG. 2C is a diagram illustrating the power density spectrum of another UWB transmitter embodiment with power shaping.

FIG. 2C is a diagram illustrating the power density spectrum of another UWB transmitter embodiment with power shaping. In this example, an analog filter is used to perform power shaping, producing a signal that has a frequency envelope 220. The analog filter is designed such that power of sub-bands 206 and 208 are reduced with respect to their nominal power while power of the data carrying sub-carriers within sub-band 210 is increased with respect to its nominal power. Bandwidth 204 of the filtered signal is approximately the same as the bandwidth of the signal shown in FIG. 2A, which is not power shaped.

Figure 2D:
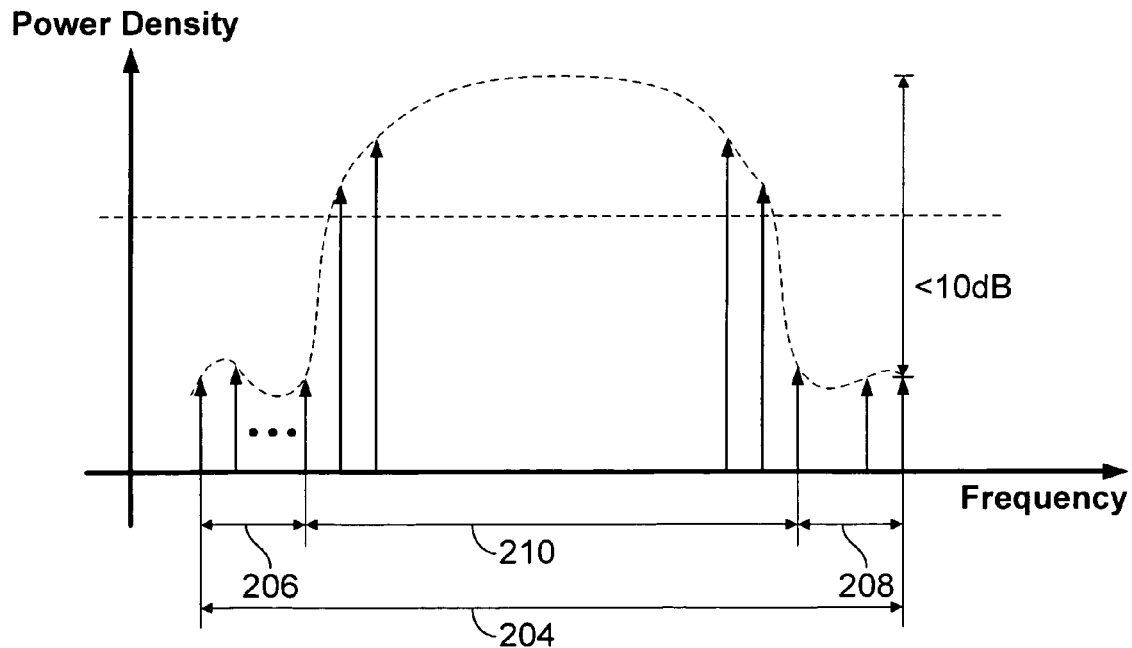
FIG. 2D is a diagram illustrating the power density spectrum of another UWB transmitter with power shaping.

FIG. 2D is a diagram illustrating the power density spectrum of another UWB transmitter with power shaping. In this example, the filter is shaped near the pilot tone frequencies such that the filtered pilot tones have power density levels that are close in amplitude. Bandwidth 204 is maintained to meet the requirement.

For the purpose of illustration, the pilot tones shown in the examples above are side pilot tones located in sub-bands on two ends of the signal's transmission band. Power shaping is also applicable to inband pilot tones within the signal's transmission band. The power levels of the inband pilot tones may be reduced in order to allow more power to be transmitted by the data carrying sub-carriers. It is preferable to keep the power difference between the maximum data carrying sub-carrier and the reduced inband pilot tone to be no more than 10 dB. Otherwise, the 10 dB bandwidth of the transmitted signal may fall below the requirement.

Figure 3A:
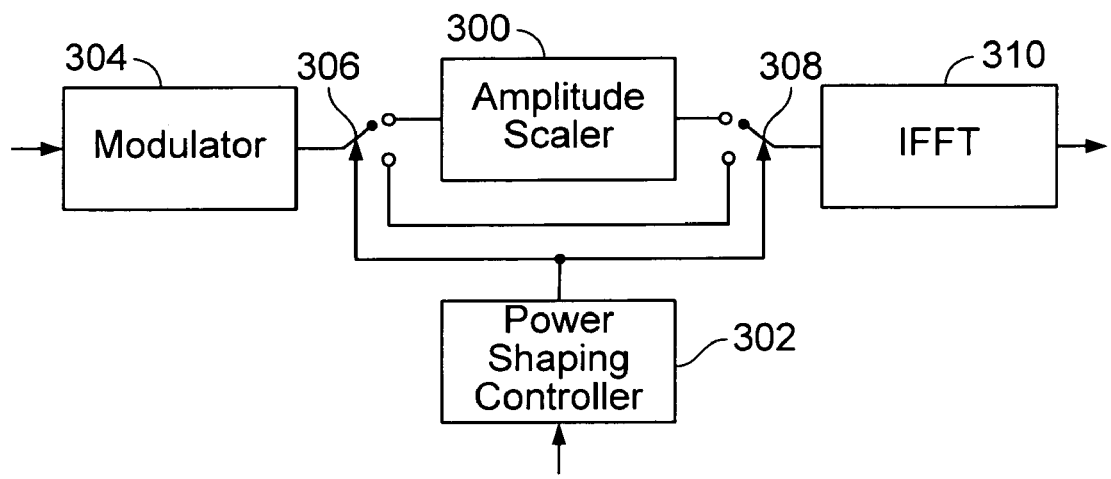
FIG. 3A is a block diagram illustrating a portion of a power shaped UWB transmitter embodiment.

The implementation of power shaping may vary for different embodiments. FIG. 3A is a block diagram illustrating a portion of a power shaped UWB transmitter embodiment. In this example, the power shaping component is included between symbol modulator 304 and IFFT processor 310. Power shaping controller 302 controls switches 306 and 308. When the switches are in the on position, amplitude scaler 300 is connected between the output of modulator 304 and the input of IFFT processor 310. Amplitude scaler 300 digitally changes the amplitude of the frequency domain inputs to IFFT processor 310. After the symbols are processed by IFFT processor 310, the power density of the data carrying sub-carriers is increased, the power density of the pilot tones is decreased, and the aggregate power and/or bandwidth are kept approximately constant. The power density spectrum of the shaped transmitter output is similar to FIG. 2B. When the switches are in their off position, the modulator output is directly connected to the IFFT input and the signal is not shaped by amplitude scaler 300.

Power shaping controller 302 may be controlled by a variety of factors, such as error rate measurements, power consumption, etc. For example, the transmitter may receive feedback from the receiver indicating that the error rate of the received signal has exceeded a threshold, thus amplitude scaler 300 is turned on to shape the power density spectrum of the transmitted signal and increase the power density of the data carrying sub-bands. On the other hand, if the power consumption of the transmitter exceeds a certain limit, amplitude scaler 300 may be turned off to conserve power.

Figure 3B:
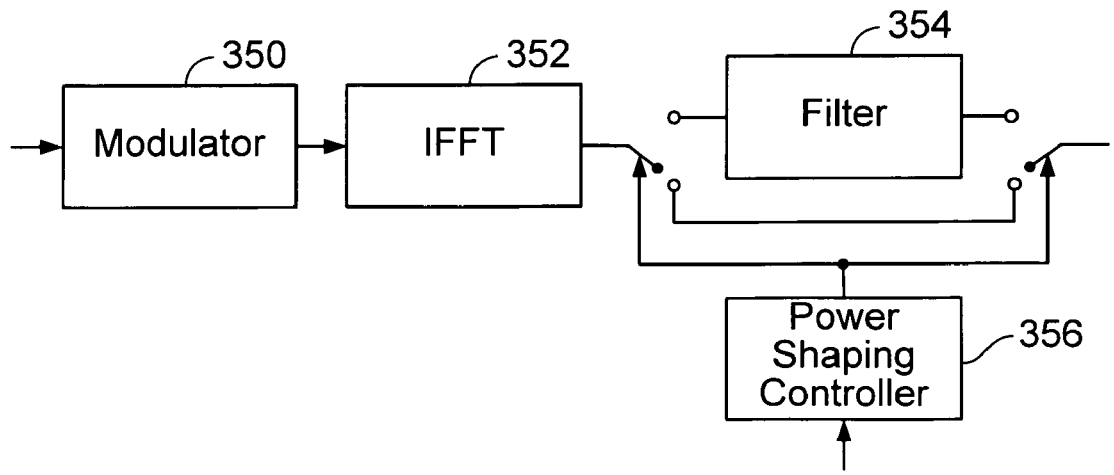
FIG. 3B is a block diagram illustrating a portion of another power shaped UWB transmitter.

FIG. 3B is a block diagram illustrating a portion of another power shaped UWB transmitter. In this example, the power shaping module is configured to shape the output of IFFT processor 352. Filter 354 may be either a digital or an analog filter that is controlled by power shaping controller 356. If, for example, an analog filter is used, the power density spectrum of the transmitter's output may resemble FIGS. 3C–3D. Besides at the output of IFFT, there are several other locations in the transmitter chain where the power shaping module can be placed.

Figure 4:
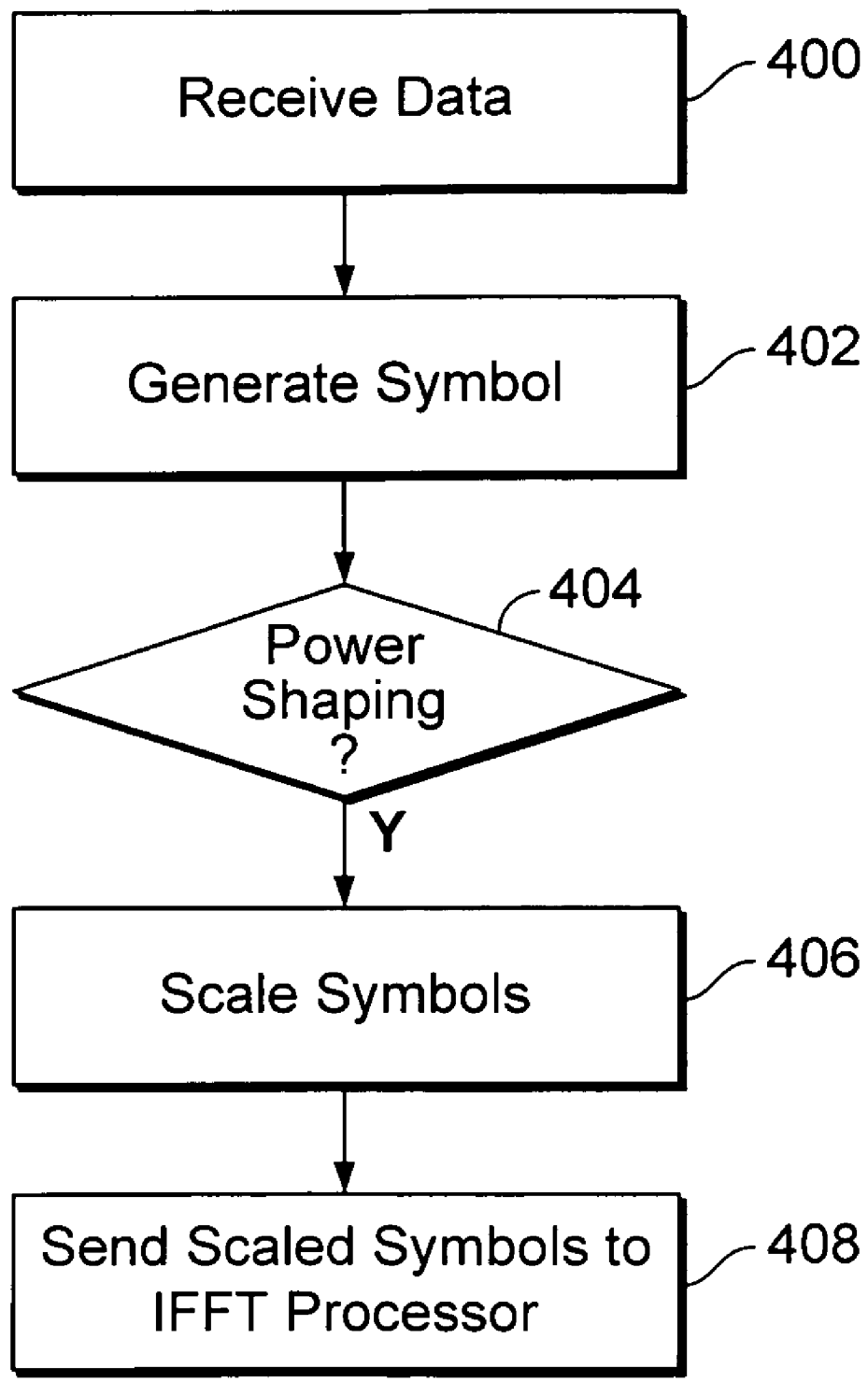
FIG. 4 is a flowchart illustrating the operation of a power shaping UWB transmitter according to some embodiments.

FIG. 4 is a flowchart illustrating the operation of a power shaping UWB transmitter according to some embodiments. In this example, the transmitter receives data from its source (400). Data is symbol modulated to generate one or more symbols (402). It is then determined whether power shaping is required (404). In some embodiments, the receiver sends the transmitter feedback regarding the quality of the received signal. If the signal quality is below a certain threshold, the receiver may indicate to the transmitter that power shaping is required. In this example, the transmitter includes a power shaping controller and an amplitude scaler similar to the ones shown in FIG. 3A. If power shaping is required, the power shaping controller turns on the amplitude scaler to adjust the symbols (406) and send the scaled symbols to the IFFT processor (408). In embodiments where a power shaping controller and a filter similar to the ones shown in FIG. 3B are used, the modulated signal may be sent to the IFFT processor and then filtered.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of transmitting an ultra wideband (UWB) signal, comprising:
    reducing power within a first sub-band associated with the UWB signal with respect to a nominal power of the UWB signal within the first sub-band;
    correspondingly increasing power within a second sub-band associated with the UWB signal with respect to a nominal power of the UWB signal within the second sub-band; and
    transmitting the UWB signal having reduced power within the first sub-band and having correspondingly increased power within the second sub-band, wherein bandwidth of the UWB signal is maintained to be greater or equal to a required bandwidth, and the bandwidth is measured as a 10 dB bandwidth.

2. A method of transmitting an ultra wideband (UWB) signal as recited in claim 1, wherein the aggregate power of the UWB signal does not exceed a limit.

3. A method of transmitting an ultra wideband (UWB) signal as recited in claim 1, wherein the first sub-band includes a pilot tone.

4. A method of transmitting an ultra wideband (UWB) signal as recited in claim 1, wherein the first sub-band includes a side pilot tones.

5. A method of transmitting an ultra wideband (UWB) signal as recited in claim 1, wherein the first sub-bands include an inband pilot tone.

6. A method of transmitting an ultra wideband (UWB) signal as recited in claim 1, wherein reducing power within the first sub-band and increasing power within a second sub-band includes scaling a plurality of modulated symbols.

7. A method of transmitting an ultra wideband (UWB) signal as recited in claim 1, wherein reducing power within the first sub-band and increasing power within a second sub-band includes filtering a time domain wave form.

8. A method of transmitting an ultra wideband (UWB) signal as recited in claim 1, wherein the first sub-band does not carry data.

9. An ultra wideband (UWB) transmitter, comprising:
    an input interface configured to receive data;
    a modulator configured to modulate received data into symbols;
    a power shaping component coupled to the modulator, configured to shape power density spectrum of a UWB signal being transmitted, including:
        reducing power within a first sub-band associated with the UWB signal with respect to a nominal power of the UWB signal within the first sub-band; and
        correspondingly increasing power within a second sub-band associated with the UWB signal with respect to a nominal power of the UWB signal within the second sub-band, wherein bandwidth of the UWB signal is maintained to be greater or equal to a required bandwidth, and the bandwidth is measured as a 10 dB bandwidth; and
    an antenna configured to transmit the UWB signal having reduced power within the first sub-band and having correspondingly increased power within the second sub-band.

10. An ultra wideband transmitter as recited in claim 9, wherein the power shaping component includes a power shaping control.

11. An ultra wideband transmitter as recited in claim 9, wherein the power shaping component includes an amplitude scaler configured to adjust amplitudes of the symbols.

12. An ultra wideband transmitter as recited in claim 9, wherein the power shaping component includes a filter configured to filter a time domain wave form.

13. A method of transmitting an ultra wideband (UWB) signal, comprising:
    determining whether to power shape the UWB signal;
    in the event that it is determined that the UWB signal is to be power shaped, (1) reducing power within a first sub-band associated with the UWB signal with respect to the nominal power of the UWB signal within the first sub-band; (2) correspondingly increasing power within a second sub-band associated with the UWB signal with respect to the nominal power of the UWB signal within the second sub-band such that bandwidth of the UWB signal is maintained to be greater than or equal to a required bandwidth; and (3) transmitting the UWB signal having reduced power within the first sub-band and having correspondingly increased power within the second sub-band.

* * * * *